United States Patent
Ju et al.

(10) Patent No.: US 10,225,007 B2
(45) Date of Patent: Mar. 5, 2019

(54) MEASURING APPARATUS AND METHOD OF FREQUENCY RESPONSE CHARACTERISTIC IMBALANCE OF OPTICAL RECEIVER

(71) Applicant: Fujitsu Limited, Kawasaki-shi, Kanagawa (JP)

(72) Inventors: Cheng Ju, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/728,957

(22) Filed: Oct. 10, 2017

(65) Prior Publication Data
US 2018/0102838 A1 Apr. 12, 2018

(30) Foreign Application Priority Data
Oct. 10, 2016 (CN) .......................... 2016 1 0884680

(51) Int. Cl.
*H04B 10/40* (2013.01)
*H04B 10/50* (2013.01)
(Continued)

(52) U.S. Cl.
CPC ..... *H04B 10/0795* (2013.01); *H04B 10/0731* (2013.01); *H04B 10/613* (2013.01);
(Continued)

(58) Field of Classification Search
CPC .............. H04B 10/0795; H04B 10/613; H04B 10/503; H04B 10/40; H04B 10/50;
(Continued)

(56) References Cited

U.S. PATENT DOCUMENTS 8,639,126 B1 * 1/2014 Nimon ............... H04B 10/2569
398/203
2007/0058702 A1 3/2007 Zhang
(Continued)

FOREIGN PATENT DOCUMENTS

| CN | 1799239 | 7/2006 |
| CN | 102291365 | 12/2011 |
| CN | 105162533 | 12/2015 |

OTHER PUBLICATIONS

Qing-song Wang, et al., "A Calibrated Method of Magnitude and Phase Errors in Digital Vector Modulation", Communications Technology, vol. 43, No. 5, 2010, 3 pages.

*Primary Examiner* — Darren E Wolf
(74) *Attorney, Agent, or Firm* — Staas & Halsey LLP

(57) ABSTRACT

A measuring method and apparatus of frequency response characteristic imbalance of an optical receiver, in which by transmitting at least one single-frequency signal in an I branch or a Q branch of an optical transmitter, an amplitude ratio and phase imbalance of the I branch and the Q branch of the optical receiver are directly calculated according to at least one pair of received signals extracted from the I branch and the Q branch of the optical receiver of which frequencies are split due to a frequency difference between lasers of the optical transmitter and the optical receiver, with no need of many times of changes of central wavelengths of lasers of the optical transmitter and the optical receiver for performing measurement for many times, and measurement of frequency response characteristic imbalance of the optical receiver may be achieved through one time of measurement, which is simple in process and accurate in measurement result.

11 Claims, 6 Drawing Sheets

(51) Int. Cl.
*H04B 10/60* (2013.01)
*H04B 10/61* (2013.01)
*H04B 10/073* (2013.01)
*H04B 10/079* (2013.01)

(52) U.S. Cl.
CPC ............ *H04B 10/079* (2013.01); *H04B 10/40* (2013.01); *H04B 10/50* (2013.01); *H04B 10/503* (2013.01); *H04B 10/60* (2013.01); *H04B 10/61* (2013.01)

(58) Field of Classification Search
CPC ........ H04B 10/60; H04B 10/61; H04B 10/07; H04B 10/079
See application file for complete search history.

(56) References Cited

U.S. PATENT DOCUMENTS

2009/0119043 A1     5/2009   Tao et al.
2013/0330070 A1*   12/2013   Yu ...................... H04B 10/2507
                                                                               398/16

* cited by examiner

MEASURING APPARATUS AND METHOD OF FREQUENCY RESPONSE CHARACTERISTIC IMBALANCE OF OPTICAL RECEIVER

CROSS-REFERENCE TO RELATED APPLICATIONS

This application claims the benefit of Chinese Application No. 201610884680.7, filed Oct. 10, 2016, in the Chinese Intellectual Property Office, the disclosure of which is incorporated herein by reference.

BACKGROUND

1. Field

This disclosure relates to a field of communication technologies, and in particular to a measuring apparatus and method of frequency response characteristic imbalance of an optical receiver.

2. Description of the Related Art

Coherent optical communication systems develops rapidly in these years since they are good in anti-dispersion, may use optical fibers free of dispersion compensation and have relatively large receiver sensitivities. As development of digital signal processing technologies, 100 Gbps polarization-division multiplexing quadrature phase shift keying (QPSK) systems have been used commercially. In order to further improve a data transmission rate, quadrature amplitude modulation (QAM) will become a candidate modulation scheme in a next generation of optical communication systems. However, a QAM signal is sensitive to nonideality of equipment, and is prone to be influenced by frequency response characteristic imbalance of an I (in-phase) branch signal and a Q (quadrature) branch signal, i.e. amplitude imbalance and phase imbalance, of an optical receiver.

An existing method for measuring frequency response characteristic imbalance of a coherent optical receiver generally uses a beat frequency measurement method, in which direct current light is respectively inputted into a local port and a signal port, and skews and amplitude ratios of I branch signals and Q branch signals of an optical receiver to which different laser frequency differences correspond are respectively measured by changing wavelengths of the direct current light.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Additional aspects and/or advantages will be set forth in part in the description which follows and, in part, will be apparent from the description, or may be learned by practice thereof In the existing beat frequency measurement method, it is needed to change central wavelengths of lasers of an optical transmitter and the optical receiver for many times, measurement values are respectively recorded after each time of changes of the central wavelengths, and calculation is performed by using the measurement values of multiple times, which makes a measurement process relatively complex.

Embodiments of this disclosure provide a measuring apparatus and method of frequency response characteristic imbalance of an optical receiver, in which many times of changes of central wavelengths of the lasers of the optical transmitter and the optical receiver are not needed for performing measurement for many times, and measurement of frequency response characteristic imbalance of the optical receiver may be achieved through one time of measurement, which is simple in process and accurate in measurement result.

According to a first aspect of the embodiments of this disclosure, there is provided a measuring apparatus of frequency response characteristic imbalance of an optical receiver, the optical receiver being directly connected to an optical transmitter, the optical transmitter including an IQ modulator, the apparatus including: a setting unit or setter configured to set a frequency difference between lasers of the optical transmitter and the optical receiver to be a nonzero value; a transmitting unit or transmitter configured to transmit at least one single-frequency signal in an I branch or a Q branch of the optical transmitter inputted into the IQ modulator; an extracting unit or extractor configured to extract at least one pair of received signals of which frequencies are split due to the frequency difference respectively from an I branch and a Q branch of the optical receiver, frequencies of the at least one pair of received signals of the I branch of the optical receiver corresponding to frequencies of the at least one pair of received signals of the Q branch of the optical receiver; and a calculating unit or calculator configured to calculate an amplitude ratio and phase imbalance of the I branch and the Q branch of the optical receiver according to the extracted at least one pair of received signals of the I branch of the optical receiver and at least one pair of received signals of the Q branch of the optical receiver.

According to a second aspect of the embodiments of this disclosure, there is provided a measuring method of frequency response characteristic imbalance of an optical receiver, the optical receiver being directly connected to an optical transmitter, the optical transmitter including an IQ modulator, the method including: setting a frequency difference of lasers of the optical transmitter and the optical receiver to be a nonzero value; transmitting at least one single-frequency signal in an I branch or a Q branch of the optical transmitter inputted into the IQ modulator; extracting at least one pair of received signals of which frequencies are split due to the frequency difference respectively from an I branch and a Q branch of the optical receiver, frequencies of the at least one pair of received signals of the I branch of the optical receiver corresponding to frequencies of the at least one pair of received signals of the Q branch of the optical receiver; and calculating an amplitude ratio and phase imbalance of the I branch and the Q branch of the optical receiver according to the extracted at least one pair of received signals of the I branch of the optical receiver and at least one pair of received signals of the Q branch of the optical receiver.

An advantage of the embodiments of this disclosure exists in that by transmitting at least one single-frequency signal in the I branch or the Q branch of the optical transmitter, the amplitude ratio and the phase imbalance of the I branch and the Q branch of the optical receiver are directly calculated according to the at least one pair of received signals extracted from the I branch and the Q branch of the optical receiver of which frequencies are split due to the frequency difference between lasers of the optical transmitter and the optical receiver, with no need of many times of changes of central wavelengths of the lasers of the optical transmitter and the optical receiver for performing measurement for many times, and measurement of frequency response characteristic imbalance of the optical receiver may be achieved through one time of measurement, which is simple in process and accurate in measurement result.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
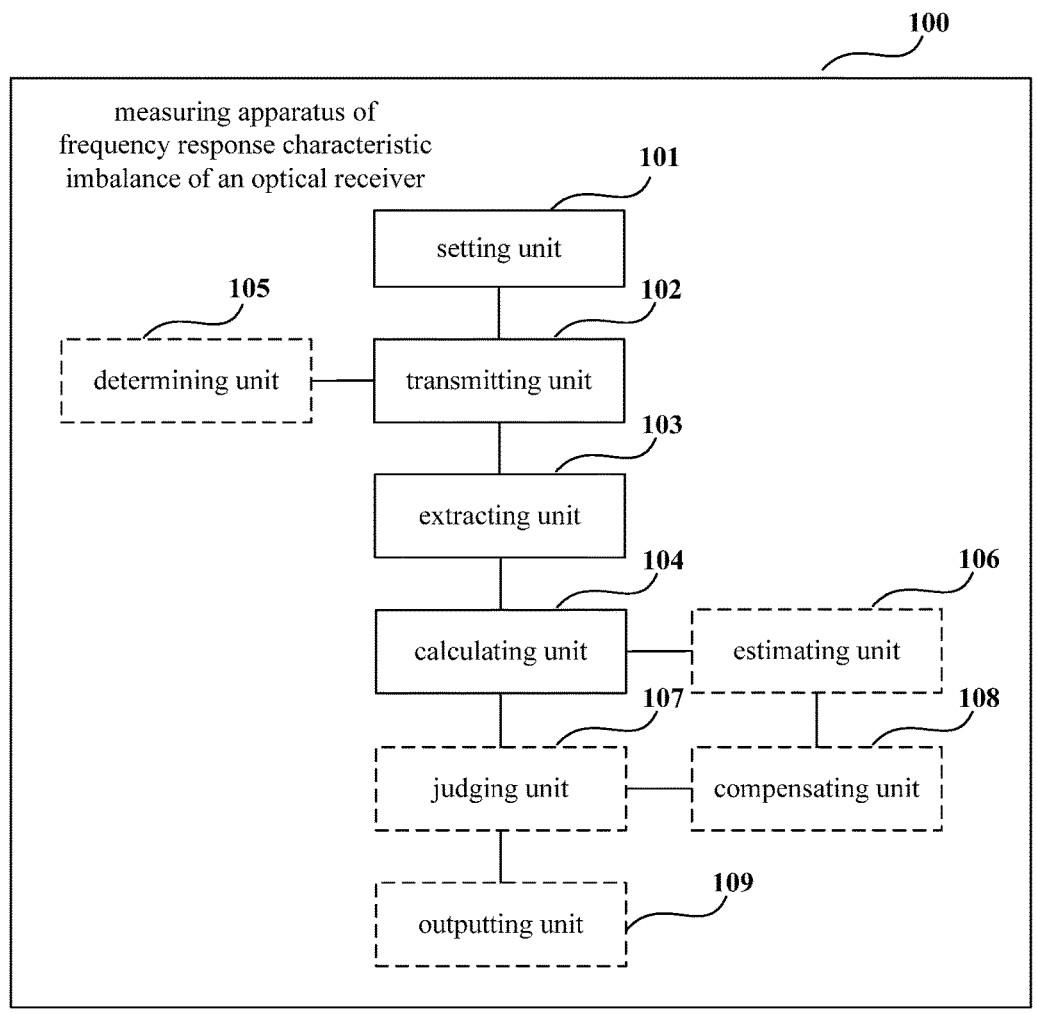
FIG. 1 is a schematic diagram of a measuring apparatus of frequency response characteristic imbalance of an optical receiver of Embodiment 1 of this disclosure.

FIG. 1 is a schematic diagram of a measuring apparatus of frequency response characteristic imbalance of an optical receiver of Embodiment 1 of this disclosure, the optical receiver being directly connected to an optical transmitter, the optical transmitter including an IQ modulator. As shown in FIG. 1, an apparatus 100 includes:

a setting unit 101 configured to set a frequency difference between lasers of the optical transmitter and the optical receiver to be a nonzero value;

a transmitting unit 102 configured to transmit at least one single-frequency signal in an I branch or a Q branch of the optical transmitter inputted into the IQ modulator;

an extracting unit 103 configured to extract at least one pair of received signals of which frequencies are split due to the frequency difference respectively from an I branch and a Q branch of the optical receiver, frequencies of the at least one pair of received signals of the I branch of the optical receiver corresponding to frequencies of the at least one pair of received signals of the Q branch of the optical receiver; and a calculating unit 104 configured to calculate an amplitude ratio and phase imbalance of the I branch and the Q branch of the optical receiver according to the extracted at least one pair of received signals of the I branch of the optical receiver and at least one pair of received signals of the Q branch of the optical receiver.

It can be seen from the above embodiment that by transmitting at least one single-frequency signal in the I branch or the Q branch of the optical transmitter, the amplitude ratio and the phase imbalance of the I branch and the Q branch of the optical receiver are directly calculated according to the at least one pair of received signals extracted from the I branch and the Q branch of the optical receiver of which frequencies are split due to the frequency difference between the lasers of the optical transmitter and the optical receiver, with no need of many times of changes of central wavelengths of the lasers of the optical transmitter and the optical receiver for performing measurement for many times, and measurement of frequency response characteristic imbalance of the optical receiver may be achieved through one time of measurement, which is simple in process and accurate in measurement result.

In this embodiment, the measuring apparatus and a method of measurement by it of the embodiment of this disclosure shall be described by taking structures of an existing optical transmitter and optical receiver as examples.

Figure 2:
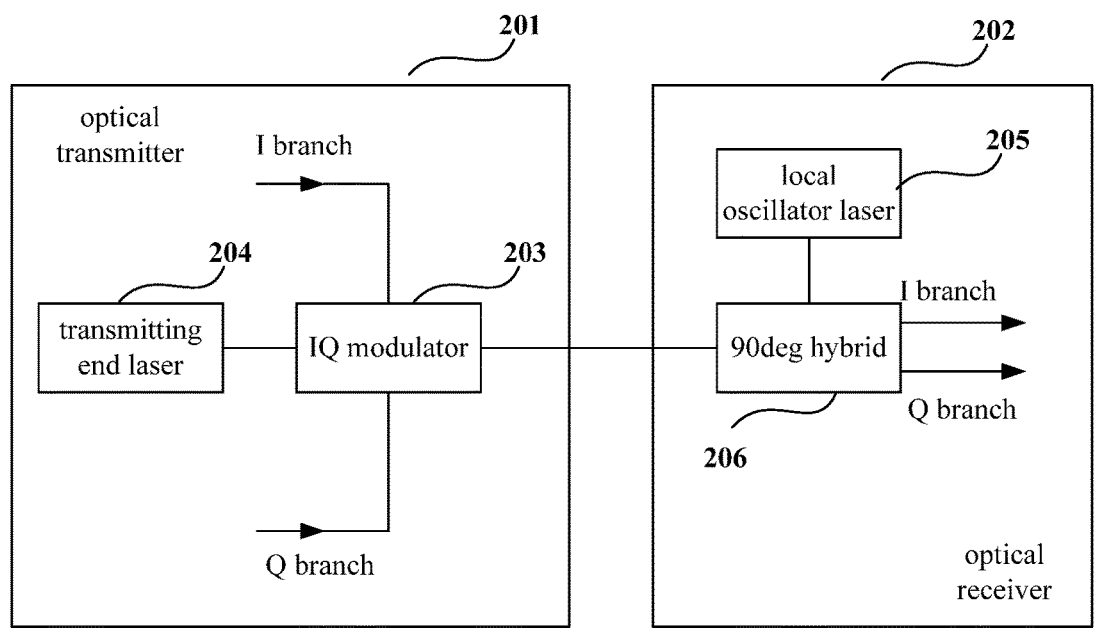
FIG. 2 is a schematic diagram of an optical transmitter and an optical receiver of Embodiment 1 of this disclosure.

FIG. 2 is a schematic diagram of an optical transmitter and an optical receiver of Embodiment 1 of this disclosure. As shown in FIG. 2, an optical transmitter 201 is directly connected to an optical receiver 202, and includes an IQ modulator 203 and a transmitting end laser 204. I branch data and Q branch data are respectively inputted into the IQ modulator 203, a laser emitted from the transmitting end laser 204 is inputted into the IQ modulator 203, and a transmitted signal modulated by the IQ modulator 203 is directly inputted into the optical receiver 202. In the optical receiver 202, laser from a local oscillator laser 205 is inputted into a 90 deg hybrid 206, and received signals of the I branch and the Q branch of the receiver are obtained after the received signal passes the 90 deg hybrid 206.

In this embodiment, the optical transmitter and optical receiver shown in FIG. 2 may use existing structures for components therein, and may further include some other components (not shown), such as a digital-to-analog converter (DAC), a photoelectric converter, and an analog-to-digital converter (ADC), etc., structures and functions of which being similar to those in the prior art, and being not going to be described herein any further.

In this embodiment, the optical transmitter is directly connected to the optical receiver via, for example, an optical fiber of a relatively small length, such as decades of centimeters to several meters.

In this embodiment, the setting unit 101 is configured to set the frequency difference between the lasers of the optical transmitter and the optical receiver to be a nonzero value, such as setting a frequency difference between the transmitting end laser 204 of the optical transmitter 201 and the local oscillator laser 205 of the optical receiver 202 shown in FIG. 2 to be a nonzero value.

In this embodiment, the frequency difference may be set according to line widths of the lasers of the optical transmitter and the optical receiver. For example, the frequency difference may be set to be a value greater than 30 M.

In this embodiment, the transmitting unit 102 configured to transmit at least one single-frequency signal in the I branch or the Q branch of the optical transmitter inputted into the IQ modulator. In this embodiment, the number of transmitted single-frequency signals may be set as actually demanded, and a transmitted single-frequency signal may be generated by using an existing method.

In this embodiment, the apparatus 100 may further include:

a determining unit 105 configured to determine at least one of a frequency, a frequency interval and power of the at least one single-frequency signal according to a peak to average power ratio of the at least one single-frequency signal.

In this embodiment, the determining unit 105 is optional, and is shown by a dotted line frame in FIG. 1.

In this embodiment, by selecting at least one single-frequency signal of a relatively small peak to average power ratio (PAPR) by changing at least one of a frequency of the at least one single-frequency signal, a frequency interval between single-frequency signals and power of the single-frequency signals, influence of a nonlinear effect of a modulator on a measurement result may be lowered.

In this embodiment, when multiple single-frequency signals are transmitted, power of them may be identical or different.

In this embodiment, when multiple single-frequency signals are transmitted, for example, the multiple single-frequency signals may be expressed as a comb spectral signal, and subcarriers therein are the single-frequency signals. For example, the comb spectral signal may be expressed by formula (1) below:

$$E1(t) = \sum_{n=1}^{N} \cos(n\omega t + \rho_n) \quad (1);$$

where, E1(t) denotes a comb spectral time-domain signal, n denotes a subcarrier index, N denotes a total number of subcarriers, ω denotes an angular frequency, and $\rho_n$ denotes an initial phase to which an n-th subcarrier corresponds.

Figure 3:
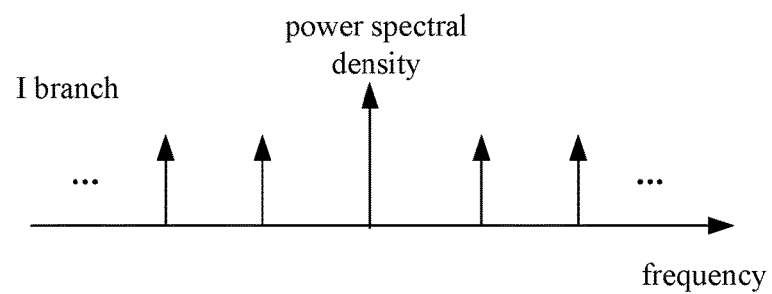
FIG. 3 is a schematic diagram of a comb spectral signal transmitted in an I branch of Embodiment 1 of this disclosure.

FIG. 3 is a schematic diagram of a comb spectral signal transmitted in the I branch of Embodiment 1 of this disclosure. As shown in FIG. 3, the transmitted comb spectral signal includes multiple single-frequency signals.

As shown in FIG. 3, the comb spectral signal is transmitted in the I branch or the Q branch inputted into the IQ modulator 203, and a signal obtained after the comb spectral signal is modulated by the IQ modulator 203, i.e. after being photoelectric converted, may be expressed by formula (2) below:

$$E2(t) = e^{j\theta(t)} \sum_{n=1}^{N} \cos(n\omega t + \rho_n) \quad (2);$$

where, E2(t) denotes a comb spectral signal after being photoelectric converted, θ(t) denotes a phase noise introduced by the transmitting end laser, n denotes a subcarrier index, N denotes a total number of subcarriers, ω denotes an angular frequency, and $\rho_n$ denotes an initial phase to which a n-th subcarrier corresponds.

As shown in FIG. 2, the comb spectral signal from the IQ modulator after being photoelectric converted directly enters into the optical receiver 202 without passing a transmission link. After being coherently down converted and photoelectric converted, when nonideality of the optical receiver is not taken into account, for example, frequency response characteristic imbalance and a phase offset induced by a mixer are not taken into account, the coherently down converted and photoelectric converted received signal may be expressed by formula (3) below:

$$E3(t) = \sum_{n=1}^{N} (e^{-j[n\omega t - \Delta\omega t + \rho_n - \theta(t) - \varphi(t)]} + e^{j[n\omega t + \Delta\omega t + \rho_n + \theta(t) + \varphi(t)]}) = \quad (3)$$

$$\sum_{n=1}^{N} [\cos(n\omega t - \Delta\omega t + \rho_n - \theta(t) - \varphi(t)) +$$

$$\cos(n\omega t + \Delta\omega t + \rho_n + \theta(t) + \varphi(t))] +$$

$$1j \sum_{n=1}^{N} [-\sin(n\omega t - \Delta\omega t + \rho_n - \theta(t) - \varphi(t)) +$$

$$\sin(n\omega t + \Delta\omega t + \rho_n + \theta(t) + \varphi(t))];$$

where, E3(t) denotes a coherently down converted and photoelectric converted received signal, θ(t) denotes a phase noise introduced by the transmitting end laser, n denotes a subcarrier index, i.e. indices of the single-frequency signals, N denotes a total number of subcarriers, i.e. a total number of the single-frequency signals, ω denotes an angular frequency, $\rho_n$ denotes an initial phase to which a n-th subcarrier corresponds, and φ(t) denotes a phase noise introduced by the local oscillator laser of the receiving end.

In this embodiment, if nonideality of the optical receiver is taken into account, the received signal may be expressed by formula (4) below:

$$E4(t) = \sum_{n=1}^{N} [\cos(n\omega t - \Delta\omega t + \rho_n - \theta(t) - \varphi(t)) + \quad (4)$$

$$\cos(n\omega t + \Delta\omega t + \rho_n + \theta(t) + \varphi(t))] +$$

$$1j * \sum_{n=1}^{N} [-\alpha_{n\omega - \Delta\omega} * \sin(n\omega t - \Delta\omega t + \rho_n - \theta(t) - \varphi(t) + \theta_{n\omega - \Delta\omega} - \hat{\theta}) +$$

$$\alpha_{n\omega + \Delta\omega} * \sin(n\omega t + \Delta\omega t + \rho_n + \theta(t) + \varphi(t) + \theta_{n\omega + \Delta\omega} + \hat{\theta})]$$

where, E4(t) denotes a coherently down converted and photoelectric converted received signal, θ(t) denotes a phase noise introduced by the transmitting end laser, n denotes a subcarrier index, N denotes a total number of subcarriers, ω denotes an angular frequency, $\rho_n$ denotes an initial phase to which a n-th subcarrier corresponds, φ(t) denotes a phase noise introduced by the local oscillator laser of the receiving end, $\alpha_{n\omega-\Delta\omega}$ and $\alpha_{n\omega+\Delta\omega}$ respectively denote ratios of amplitudes of the Q branch of the optical receiver to amplitudes of the I branch of the optical receiver at frequencies nω−Δω and nω+Δω, $\theta_{n\omega-\Delta\omega}$ and $\theta_{n\omega+\Delta\omega}$ are respectively phase imbalance of the Q branch of the optical receiver relative to the I branch of the optical receiver at frequencies nω−Δω and nω+Δω, $\hat{\theta}$ is a phase offset induced by a mixer of the optical receiver, and Δω denotes a frequency difference between the laser of the optical transmitter and the laser of the optical receiver.

Figure 4:
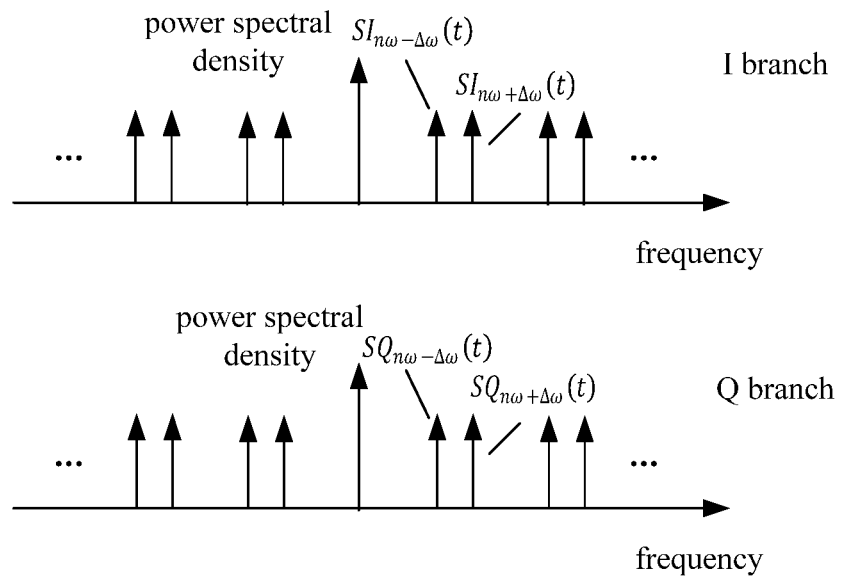
FIG. 4 is a schematic diagram of a received signal of Embodiment 1 of this disclosure.

FIG. 4 is a schematic diagram of a received signal of Embodiment 1 of this disclosure. As shown in FIG. 4, received signals in the I branch and the Q branch of the optical receiver include multiple pairs of single-frequency signals, two single-frequency signals in each pair of single-frequency signals being separated apart with respect to frequencies due to the frequency difference Δω between the laser of the optical transmitter and the laser of the optical receiver, and each pair of received signals in the I branch and each pair of received signals in the Q branch corresponding to each other with respect to frequencies, that is, frequencies of corresponding two pairs of received signals in the I branch and the Q branch are identical.

In this embodiment, description shall be given by taking corresponding two pairs of received signals in the I branch and the Q branch as examples. For example, as shown in FIG. 4, the pair of received signals in the I branch are $SI_{n\omega-\Delta\omega}(t)$ and $SI_{n\omega+\Delta\omega}(t)$, and the pair of received signals in the I branch corresponding thereto are $SQ_{n\omega-\Delta\omega}(t)$ and $SQ_{n\omega+\Delta\omega}(t)$, frequencies of $SI_{n\omega-\Delta\omega}(t)$ and $SQ_{n\omega-\Delta\omega}(t)$ are both nω−Δω, and frequencies of $SI_{n\omega+\Delta\omega}(t)$ and $SQ_{n\omega+\Delta\omega}(t)$ are both nω−Δω.

In this embodiment, the extracting unit 103 is configured to extract at least one pair of received signals of which frequencies are split due to the frequency difference respectively from an I branch and a Q branch of the optical receiver, such as extracting the corresponding pairs of received signals in the I branch and the Q branch shown in FIG. 4. Where sequence numbers of the extracted pairs of received signals correspond to sequence numbers of the single-frequency signals transmitted in the I branch or the Q branch of the optical transmitter one by one.

In this embodiment, the extracting unit 103 may use an existing method to extract the pairs of received signals, such as extracting the received signals near frequencies of the received signals.

In this embodiment, after the extracting unit 103 extracts the pairs of received signals, the calculating unit 104 calculates the amplitude ratio and the phase imbalance of the Q branch and the I branch of the optical receiver according to the extracted at least one pair of received signals of the I branch of the optical receiver and at least one pair of received signals of the Q branch of the optical receiver.

In this embodiment, a method for calculating the amplitude ratio and the phase imbalance of the Q branch and the I branch of the optical receiver shall be illustrated by taking an extracted n-th pair of received signals $SI_{n\omega-\Delta\omega}(t)$ and $SI_{n\omega+\Delta\omega}(t)$ in the I branch and an extracted n-th pair of received signals $SQ_{n\omega-\Delta\omega}(t)$ and $SQ_{n\omega+\Delta\omega}(t)$ in the Q branch as examples.

In this embodiment, in a case where the phase offset induced by the mixer of the optical receiver is known, for example, the phase offset is measured in advance, or the phase offset is informed by a manufacturer of the optical receiver in advance, based on above formula (4), the amplitude ratio and the phase imbalance of the Q branch and the I branch of the optical receiver may be calculated according to formulae (5) and (6) below:

$$\begin{cases} \alpha_{n\omega-\Delta\omega} = \sqrt{\dfrac{E\{|SQ_{n\omega-\Delta\omega}(t)|^2\}}{E\{|SI_{n\omega-\Delta\omega}(t)|^2\}}} \\ \alpha_{n\omega+\Delta\omega} = \sqrt{\dfrac{E\{|SQ_{n\omega+\Delta\omega}(t)|^2\}}{E\{|SI_{n\omega+\Delta\omega}(t)|^2\}}} \end{cases} \quad (5)$$

$$\begin{cases} \theta_{n\omega-\Delta\omega} = \alpha_{n\omega-\Delta\omega} = \sin\left(-\dfrac{2E\{SI_{n\omega-\Delta\omega}(t)*SQ_{n\omega-\Delta\omega}(t)\}}{\alpha_{n\omega-\Delta\omega}}\right) + \hat{\theta} \\ \theta_{n\omega+\Delta\omega} = \alpha_{n\omega+\Delta\omega} = \sin\left(\dfrac{2E\{SI_{n\omega+\Delta\omega}(t)*SQ_{n\omega+\Delta\omega}(t)\}}{\alpha_{n\omega+\Delta\omega}}\right) - \hat{\theta} \end{cases} \quad (6)$$

where, $\alpha_{n\omega-\Delta\omega}$ and $\alpha_{n\omega+\Delta\omega}$ respectively denote ratios of amplitudes of the Q branch of the optical receiver to amplitudes of the I branch of the optical receiver at frequencies nω−Δω and nω−Δω, $\theta_{n\omega-\Delta\omega}$ and $\theta_{n\omega+\Delta\omega}$ are respectively phase imbalance of the Q branch of the optical receiver relative to the I branch of the optical receiver at frequencies nω−Δω and nω+Δω, $SI_{n\omega-\Delta\omega}(t)$ and $SQ_{n\omega-\Delta\omega}(t)$ respectively denote two received signals of the frequency nω−Δω in the I branch and the Q branch, $SI_{n\omega+\Delta\omega}(t)$ and $SQ_{n\omega+\Delta\omega}(t)$ respectively denote other two received signals of the frequency nω+Δω in the I branch and the Q branch, E{.} is a mean value calculation operation, $\hat{\theta}$ denotes a phase offset induced by the mixer of the optical receiver, and Δω denotes a frequency difference between the laser of the optical transmitter and the laser of the optical receiver.

The method for calculating the amplitude ratio and the phase imbalance of the Q branch and the I branch of the optical receiver at the corresponding frequencies are described above for the respectively pairs of received signals in the I branch and the Q branch, and for other pairs of received signals, calculation methods are identical, which shall not be described herein any further.

After the amplitude ratio and the phase imbalance of the Q branch and the I branch at multiple frequencies are calculated, calculation results may be fitted to obtain amplitude ratios and phase imbalance of the Q branch and the I branch with the whole signal frequency range.

In this embodiment, when the transmitting unit 102 transmits only one single-frequency signal, the extracting unit 103 may only extract a pair of received signals of which frequencies are split due to the frequency difference respectively from the I branch and the Q branch. For example, when a pair of received signals $SI_{n\omega-\Delta\omega}(t)$ and $SI_{n\omega+\Delta\omega}(t)$ in the I branch and a pair of received signals $SQ_{n\omega-\Delta\omega}(t)$ and $SQ_{n\omega+\Delta\omega}(t)$ in the Q branch are extracted, the calculating unit 104 may calculate the amplitude ratio and the phase imbalance of the Q branch and the I branch of the optical receiver at the frequencies nω−Δω and nω+Δω by using the above method according to the two pairs of received signals.

In this embodiment, in a case where the phase offset induced by the mixer of the optical receiver is unknown, the phase offset induced by the mixer needs to be estimated before the amplitude ratio and the phase imbalance of the Q branch and the I branch of the optical receiver are calculated. For example, the apparatus may further include:

an estimating unit 106 configured to estimate a phase offset induced by the mixer.

In this case, the calculating unit 104 calculates the amplitude ratio and the phase imbalance of the Q branch and the I branch of the optical receiver according to the extracted at least one pair of received signals of the I branch of the optical receiver and at least one pair of received signals of the Q branch of the optical receiver and the estimated phase offset, with a method being the same as that described above, which shall not be described herein any further.

In this embodiment, the estimating unit 106 may estimate the phase offset by using an existing method, such as using a Gram-Schmidt orthogonalization procedure (GSOP) algorithm to estimate the phase offset induced by the mixer.

In this embodiment, the apparatus 100 may further include:

a judging unit 107 configured to judge whether the calculated phase imbalance of the Q branch and the I branch satisfies a predetermined condition;

a compensating unit 108 configured to perform phase imbalance compensation on the received signal of the I branch or the Q branch of the optical receiver according to the calculated phase imbalance of the Q branch and the I branch of the optical receiver when the predetermined condition is not satisfied, to be used for re-estimating the phase offset induced by the mixer and recalculating the phase imbalance of the Q branch and the I branch of the optical receiver; and an outputting unit 109 configured to output the amplitude ratio and the phase imbalance of the Q branch and the I branch of the optical receiver when the predetermined condition is satisfied.

In this embodiment, with the above iteration process, an effect of the phase imbalance between the Q branch and the I branch on the estimation of the phase offset induced by the mixer may be reduced, hence, accuracy of the estimation of the phase offset induced by the mixer may be improved, and accuracy of calculation of the phase imbalance between the Q branch and the I branch may further be improved.

In this embodiment, the estimating unit 106, the judging unit 107, the compensating unit 108 and the outputting unit 109 are optional, which are shown by dotted line frames in FIG. 1.

In this embodiment, the predetermined condition may be that the number of times of calculating the phase imbalance of the Q branch and the I branch of the optical receiver, ie. the number of times of iteration reaches a first threshold, or that a difference between phase imbalance of the Q branch and the I branch of the optical receiver calculated at a current time and phase imbalance of the Q branch and the I branch of the optical receiver calculated at a previous time is less than a second threshold. Wherein, the first threshold and the second threshold may be set as actually demanded.

In this embodiment, re-estimation of the phase offset induced by the mixer and recalculation of the phase imbalance between the Q branch and the I branch of the optical receiver are identical to those described above, which shall not be described herein any further.

The above-described measuring apparatus and method are directed to a single-polarization system. And for a dual-polarization system, measurement may be performed for respective polarization states, and a measuring method is identical that described above, which shall not be described herein any further.

It can be seen from the above embodiment that by transmitting at least one single-frequency signal in the I branch or the Q branch of the optical transmitter, the amplitude ratio and the phase imbalance of the I branch and the Q branch of the optical receiver are directly calculated according to at least one pair of received signals extracted from the I branch and the Q branch of the optical receiver of which frequencies are split due to the frequency difference between lasers of the optical transmitter and the optical receiver, with no need of many times of changes of central wavelengths of the lasers of the optical transmitter and the optical receiver for performing measurement for many times, and measurement of frequency response characteristic imbalance of the optical receiver may be achieved through one time of measurement, which is simple in process and accurate in measurement result.

Embodiment 2

Figure 5:
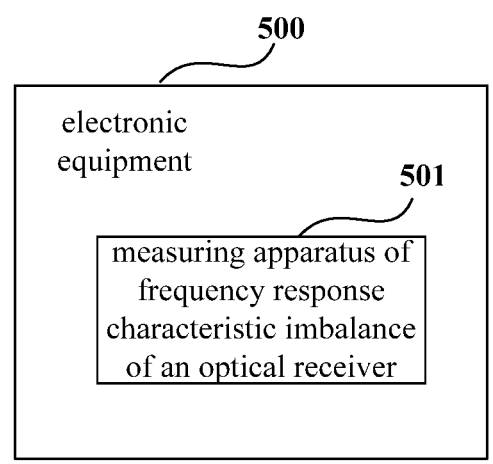
FIG. 5 is a schematic diagram of electronic equipment of Embodiment 2 of this disclosure.

The embodiment of this disclosure further provides electronic equipment. FIG. 5 is a schematic diagram of the electronic equipment of Embodiment 2 of this disclosure. As shown in FIG. 5, electronic equipment 500 includes a measuring apparatus 501 of frequency response characteristic imbalance of an optical receiver, a structure and functions of which being identical to those described in Embodiment 1, which shall not be described herein any further. In this embodiment, the electronic equipment may be provided in an optical receiver or an optical transmitter, or may be used as an individual product.

Figure 6:
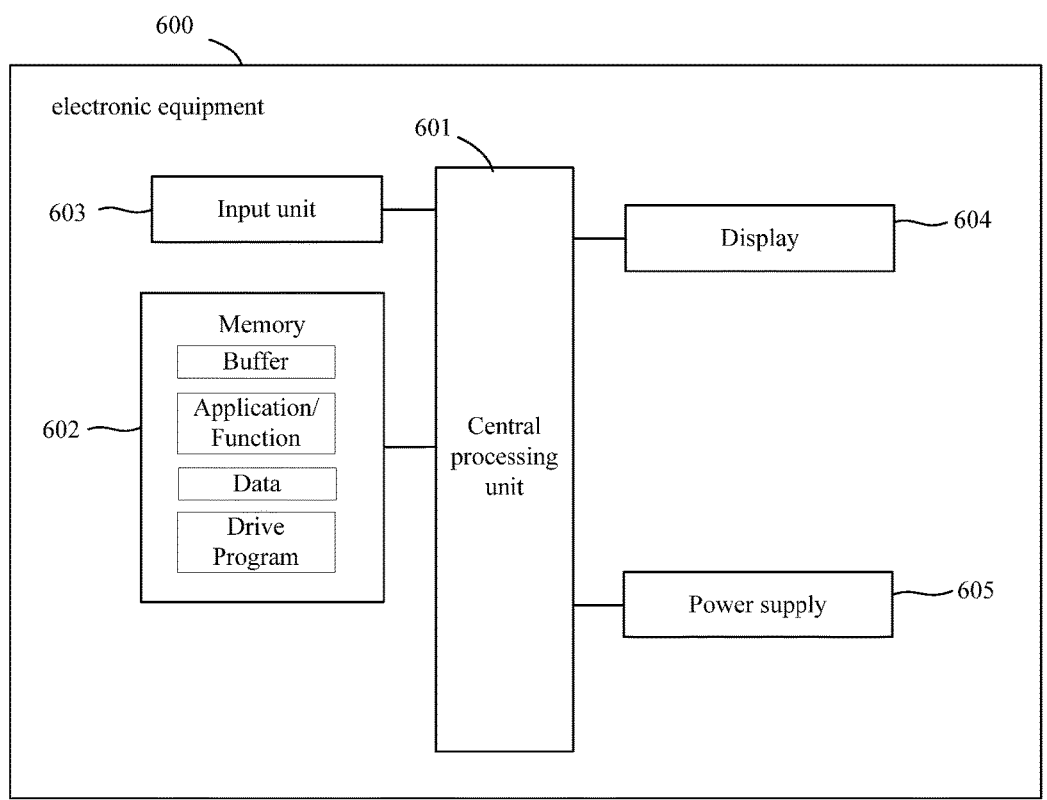
FIG. 6 is a block diagram of a systematic structure of electronic equipment of Embodiment 2 of this disclosure.

FIG. 6 is a block diagram of a systematic structure of electronic equipment of Embodiment 2 of this disclosure. As shown in FIG. 6, electronic equipment 600 may include a central processing unit 601 and a memory 602, the memory 602 being coupled to the central processing unit 601. This figure is illustrative only, and other types of structures may also be used, so as to supplement or replace this structure and achieve a telecommunications function or other functions.

As shown in FIG. 6, the electronic equipment 600 may further include an input unit 603, a display 604 and a power supply 605.

In one implementation, the functions of the measuring apparatus of frequency response characteristic imbalance of an optical receiver may be integrated into the central processing unit 601.

In this embodiment, the optical receiver is directly connected to an optical transmitter, the optical transmitter including an IQ modulator, and the central processing unit 601 may be configured to: set a frequency difference between lasers of the optical transmitter and the optical receiver to be a nonzero value; transmit at least one single-frequency signal in an I branch or a Q branch of the optical transmitter inputted into the IQ modulator; extract at least one pair of received signals of which frequencies are split due to the frequency difference respectively from an I branch and a Q branch of the optical receiver, frequencies of the at least one pair of received signals of the I branch of the optical receiver corresponding to frequencies of the at least one pair of received signals of the Q branch of the optical receiver; and calculate an amplitude ratio and phase imbalance of the I branch and the Q branch of the optical receiver according to the extracted at least one pair of received signals of the I branch of the optical receiver and at least one pair of received signals of the Q branch of the optical receiver.

Wherein, the central processing unit 601 may further be configured to: determine at least one of a frequency, a frequency interval and power of the at least one single-frequency signal according to a peak to average power ratio of the at least one single-frequency signal.

Wherein, the optical receiver includes a mixer, the central processing unit 601 may further be configured to: estimate a phase offset induced by the mixer, and the calculating an amplitude ratio and phase imbalance of the I branch and the Q branch of the optical receiver according to the extracted at least one pair of received signals of the I branch of the optical receiver and at least one pair of received signals of the Q branch of the optical receiver includes: calculating the amplitude ratio and the phase imbalance of the Q branch and the I branch of the optical receiver according to the extracted at least one pair of received signals of the I branch of the optical receiver and at least one pair of received signals of the Q branch of the optical receiver and the estimated phase offset.

Wherein, the central processing unit 601 may further be configured to: judge whether the calculated phase imbalance of the Q branch and the I branch satisfies a predetermined condition; perform phase imbalance compensation on the received signal of the I branch or the Q branch of the optical receiver according to the calculated phase imbalance of the Q branch and the I branch of the optical receiver when the predetermined condition is not satisfied, to be used for re-estimating the phase offset induced by the mixer and recalculating the phase imbalance of the Q branch and the I branch of the optical receiver; and output the amplitude ratio and the phase imbalance of the Q branch and the I branch of the optical receiver when the predetermined condition is satisfied.

Wherein, the predetermined condition is that the number of times of calculating the phase imbalance of the Q branch and the I branch of the optical receiver reaches a first threshold, or that a difference between phase imbalance of the Q branch and the I branch of the optical receiver calculated at a current time and phase imbalance of the Q branch and the I branch of the optical receiver calculated at a previous time is less than a second threshold.

In this embodiment, the electronic equipment 600 does not necessarily include all the parts shown in FIG. 6.

As shown in FIG. 6, the central processing unit 601 is sometimes referred to as a controller or control, and may include a microprocessor or other processor devices and/or logic devices. The central processing unit 601 receives input and controls operations of every components of the electronic equipment 600.

The memory 602 may be, for example, one or more of a buffer memory, a flash memory, a hard drive, a mobile medium, a volatile memory, a nonvolatile memory, or other suitable devices. And the central processing unit 601 may execute the program stored in the memory 602, to realize information storage or processing, etc. Functions of other parts are similar to those of the prior art, which shall not be described herein any further. The parts of the electronic equipment 600 may be realized by specific hardware, firmware, software, or any combination thereof, without departing from the scope of the present disclosure.

It can be seen from the above embodiment that by transmitting at least one single-frequency signal in the I branch or the Q branch of the optical transmitter, the amplitude ratio and the phase imbalance of the I branch and the Q branch of the optical receiver are directly calculated according to at least one pair of received signals extracted from the I branch and the Q branch of the optical receiver of which frequencies are split due to the frequency difference between lasers of the optical transmitter and the optical receiver, with no need of many times of changes of central wavelengths of the lasers of the optical transmitter and the optical receiver for performing measurement for many times, and measurement of frequency response characteristic imbalance of the optical receiver may be achieved through one time of measurement, which is simple in process and accurate in measurement result.

Embodiment 3

The embodiment of this disclosure further provides a measuring method of frequency response characteristic imbalance of an optical receiver, corresponding to the measuring apparatus of frequency response characteristic imbalance of an optical receiver in Embodiment 1.

Figure 7:
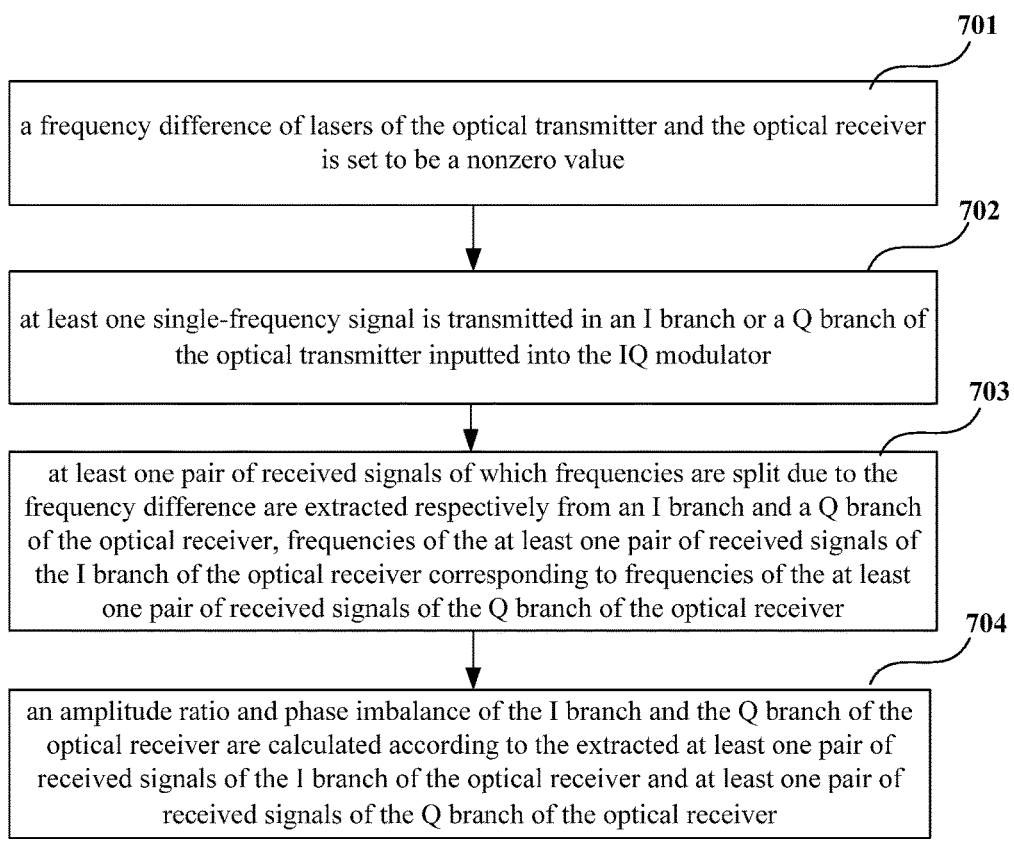
FIG. 7 is a flowchart of a measuring method of frequency response characteristic imbalance of an optical receiver of Embodiment 3 of this disclosure.

FIG. 7 is a flowchart of the measuring method of frequency response characteristic imbalance of an optical receiver of Embodiment 3 of this disclosure, in which the optical receiver is directly connected to an optical transmitter, the optical transmitter including an IQ modulator. As shown in FIG. 7, the method includes:

Step 701: a frequency difference of lasers of the optical transmitter and the optical receiver is set to be a nonzero value;

Step 702: at least one single-frequency signal is transmitted in an I branch or a Q branch of the optical transmitter inputted into the IQ modulator;

Step 703: at least one pair of received signals of which frequencies are split due to the frequency difference are extracted respectively from an I branch and a Q branch of the optical receiver, frequencies of the at least one pair of received signals of the I branch of the optical receiver corresponding to frequencies of the at least one pair of received signals of the Q branch of the optical receiver; and Step 704: an amplitude ratio and phase imbalance of the I branch and the Q branch of the optical receiver are calculated according to the extracted at least one pair of received signals of the I branch of the optical receiver and at least one pair of received signals of the Q branch of the optical receiver.

Figure 8:
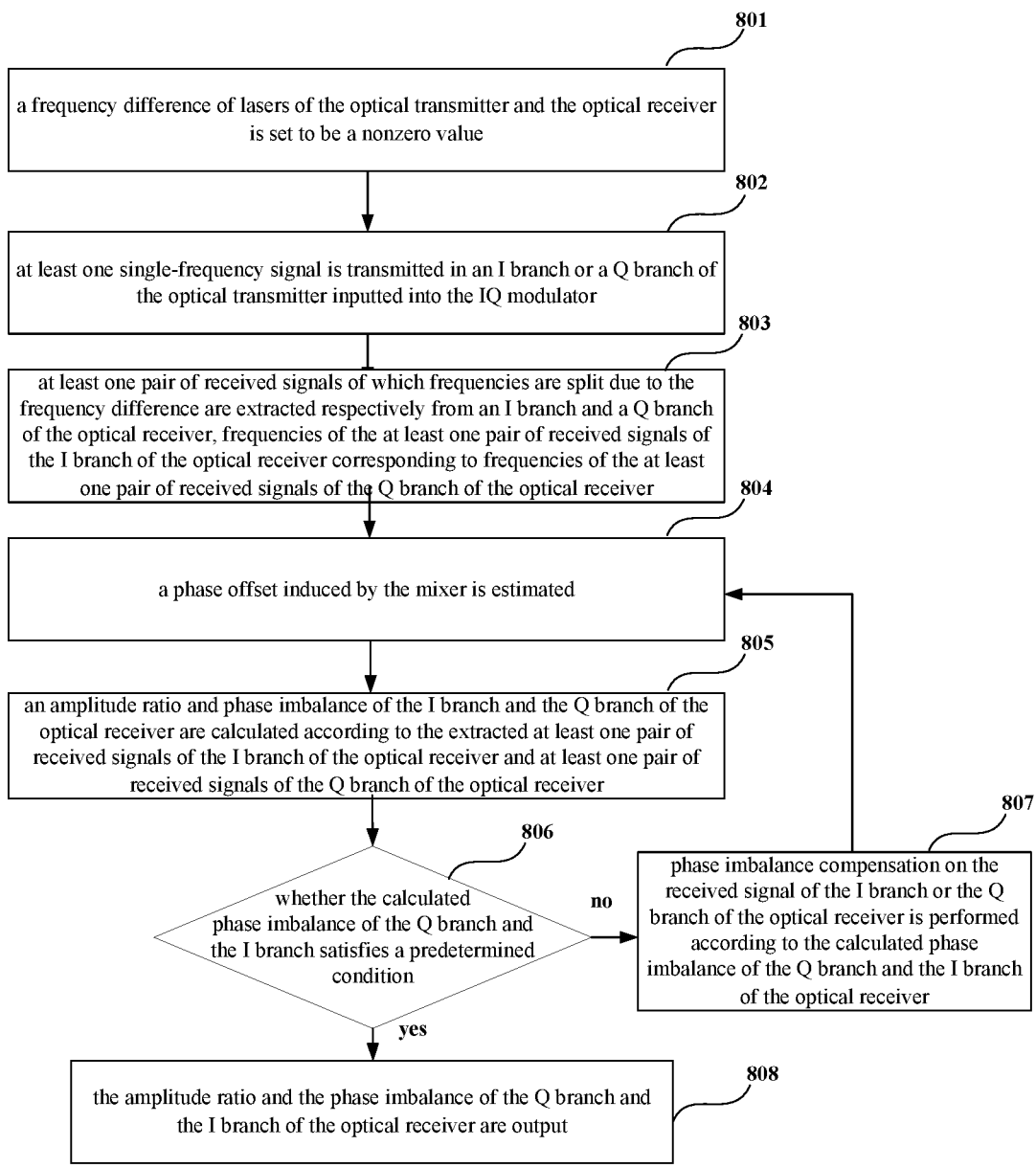
FIG. 8 is another flowchart of a measuring method of frequency response characteristic imbalance of an optical receiver of Embodiment 3 of this disclosure.

In this embodiment, for a case where a phase offset induced by the mixer of the optical receiver is unknown, the phase offset induced by the mixer needs to be estimated before the amplitude ratio and the phase imbalance of the Q branch and the I branch of the optical receiver are calculated. FIG. 8 is another flowchart of the measuring method of frequency response characteristic imbalance of an optical receiver of Embodiment 3 of this disclosure. As shown in FIG. 8, the method includes:

Step 801: a frequency difference of lasers of the optical transmitter and the optical receiver is set to be a nonzero value;

Step 802: at least one single-frequency signal is transmitted in an I branch or a Q branch of the optical transmitter inputted into the IQ modulator;

Step 803: at least one pair of received signals of which frequencies are split due to the frequency difference are extracted respectively from an I branch and a Q branch of the optical receiver, frequencies of the at least one pair of received signals of the I branch of the optical receiver corresponding to frequencies of the at least one pair of received signals of the Q branch of the optical receiver;

Step 804: a phase offset induced by the mixer is estimated;

Step 805: an amplitude ratio and phase imbalance of the I branch and the Q branch of the optical receiver are calculated according to the extracted at least one pair of received signals of the I branch of the optical receiver and at least one pair of received signals of the Q branch of the optical receiver;

Step 806: it is judged whether the calculated phase imbalance of the Q branch and the I branch satisfies a predetermined condition, entering into step 807 when a judgment result is "no", and entering into step 808 when a judgment result is "yes";

Step 807: phase imbalance compensation on the received signal of the I branch or the Q branch of the optical receiver is performed according to the calculated phase imbalance of the Q branch and the I branch of the optical receiver; and Step 808: the amplitude ratio and the phase imbalance of the Q branch and the I branch of the optical receiver are output.

In this embodiment, particular implementations of steps 701-704 and steps 801-808 are identical to those described in Embodiment 1, which shall not be described herein any further.

It can be seen from the above embodiment that by transmitting at least one single-frequency signal in the I branch or the Q branch of the optical transmitter, the amplitude ratio and the phase imbalance of the I branch and the Q branch of the optical receiver are directly calculated according to at least one pair of received signals extracted from the I branch and the Q branch of the optical receiver of which frequencies are split due to the frequency difference between lasers of the optical transmitter and the optical receiver, with no need of many times of changes of central wavelengths of the lasers of the optical transmitter and the optical receiver for performing measurement for many times, and measurement of frequency response characteristic imbalance of the optical receiver may be achieved through one time of measurement, which is simple in process and accurate in measurement result.

An embodiment of the present disclosure provides a computer readable program code, which, when executed in a measuring apparatus of frequency response characteristic imbalance of an optical receiver or electronic equipment, will cause a computer unit to carry out the measuring method of frequency response characteristic imbalance of an optical receiver described in Embodiment 3 in the measuring apparatus or the electronic equipment.

An embodiment of the present disclosure provides a computer readable medium, including a computer readable program code, which will cause a computer unit to carry out the measuring method of frequency response characteristic imbalance of an optical receiver described in Embodiment 3 in a measuring apparatus of frequency response characteristic imbalance of an optical receiver or electronic equipment.

The carrying out the measuring method in the measuring apparatus of frequency response characteristic imbalance of an optical receiver or the electronic equipment described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 7 or 8. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A non-transitory computer readable storage memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a measuring apparatus or electronic equipment. For example, if a measuring apparatus or electronic equipment employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams shown in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A measuring apparatus of frequency response characteristic imbalance of an optical receiver, the optical receiver being directly connected to an optical transmitter, the optical transmitter comprising an in-phase quadrature (IQ) modulator, the apparatus comprising:

a memory that stores a plurality of instructions; and
a processor coupled to the memory and configured to execute the instructions to:
set a frequency difference between lasers of the optical transmitter and the optical receiver to be a nonzero value;
transmit at least one single-frequency signal in at least one of an I branch or a Q branch of the optical transmitter inputted into the IQ modulator;
extract at least one pair of received signals of which frequencies are split due to the frequency difference respectively from the I branch and the Q branch, obtained via processing of a 90deg hybrid, a local oscillator laser, a photodetector and an analog-to-digital converter in the optical receiver, of the optical receiver, frequencies of the at least one pair of received signals of the I branch of the optical receiver corresponding to frequencies of the at least one pair of received signals of the Q branch of the optical receiver; and
calculate an amplitude ratio of the I branch and the Q branch of the optical receiver according to an extracted at least one pair of received signals of the I branch of the optical receiver and the at least one pair of received signals of the Q branch of the optical receiver, and calculate a phase imbalance of the I branch and the Q branch of the optical receiver according to an extracted at least one pair of received signals of the I branch of the optical receiver and the at least one pair of received signals of the Q branch of the optical receiver, the amplitude ratio of the I branch and the Q branch of the optical receiver and a phase offset induced by a mixer of the optical receiver.

2. The apparatus according to claim 1, wherein the processor is further configured to execute the instructions to:
determine at least one of a frequency, or a frequency interval or power of the at least one single-frequency signal according to a peak to average power ratio of the at least one single-frequency signal.

3. The apparatus according to claim 1, wherein the optical receiver comprises the mixer, and the processor is further configured to execute the instructions to:
estimate a phase offset induced by the mixer;
and calculate the amplitude ratio and the phase imbalance of the Q branch and the I branch of the optical receiver according to the extracted at least one pair of received signals of the I branch of the optical receiver and the at least one pair of received signals of the Q branch of the optical receiver and an estimated phase offset.

4. The apparatus according to claim 3, wherein the processor is further configured to execute the instructions to:
judge whether a calculated phase imbalance of the Q branch and the I branch satisfies a predetermined condition;
perform phase imbalance compensation on the received signal of the I branch or the Q branch of the optical receiver according to the calculated phase imbalance of the Q branch and the I branch of the optical receiver when the predetermined condition is not satisfied, to be used for re-estimating the estimated phase offset induced by the mixer and recalculating the phase imbalance of the Q branch and the I branch of the optical receiver; and
output the amplitude ratio and the phase imbalance of the Q branch and the I branch of the optical receiver when the predetermined condition is satisfied.

5. The apparatus according to claim 4, wherein,
the predetermined condition is that a number of times of calculating the phase imbalance of the Q branch and the I branch of the optical receiver reaches a first threshold, or a difference between phase imbalance of the Q branch and the I branch of the optical receiver calculated at a current time and phase imbalance of the Q branch and the I branch of the optical receiver calculated at a previous time is less than a second threshold.

6. A measuring method of frequency response characteristic imbalance of an optical receiver, the optical receiver being directly connected to an optical transmitter, the optical transmitter comprising an in-phase quadrature (IQ) modulator, the method comprising:
setting a frequency difference of lasers of the optical transmitter and the optical receiver to a nonzero value;
transmitting at least one single-frequency signal in at least one of an I branch, or a Q branch of the optical transmitter inputted into the IQ modulator;
extracting at least one pair of received signals of which frequencies are split due to the frequency difference respectively from the I branch and the Q branch, obtained via processing of a 90 deg hybrid, a local oscillator laser, a photodetector and an analog-to-digital converter in the optical receiver, of the optical receiver, frequencies of the at least one pair of received signals of the I branch of the optical receiver corresponding to frequencies of the at least one pair of received signals of the Q branch of the optical receiver; and
calculating an amplitude ratio of the I branch and the Q branch of the optical receiver according to an extracted at least one pair of received signals of the I branch of the optical receiver and the at least one pair of received signals of the Q branch of the optical receiver, and calculating a phase imbalance of the I branch and the Q branch of the optical receiver according to an extracted at least one pair of received signals of the I branch of the optical receiver and the at least one pair of received signals of the Q branch of the optical receiver, the amplitude ratio of the I branch and the Q branch of the optical receiver and a phase offset induced by a mixer of the optical receiver.

7. The method according to claim 6, wherein the method further comprises:
determining at least one of a frequency, or a frequency interval and power of the at least one single-frequency signal according to a peak to average power ratio of the at least one single-frequency signal.

8. The method according to claim 6, wherein the optical receiver comprises a mixer, and the method further comprises:
estimating a phase offset induced by the mixer;
and the calculating the amplitude ratio and phase imbalance of the I branch and the Q branch of the optical receiver according to the extracted at least one pair of received signals of the I branch of the optical receiver and the at least one pair of received signals of the Q branch of the optical receiver comprises:
calculating the amplitude ratio and the phase imbalance of the Q branch and the I branch of the optical receiver according to the extracted at least one pair of received signals of the I branch of the optical receiver and the at least one pair of received signals of the Q branch of the optical receiver and an estimated phase offset.

9. The method according to claim 8, wherein the method further comprises:
judging whether a calculated phase imbalance of the Q branch and the I branch satisfies a predetermined condition;
performing phase imbalance compensation on the received signal of at least one of the I branch or the Q branch of the optical receiver according to the calculated phase imbalance of the Q branch and the I branch of the optical receiver when the predetermined condition is not satisfied, to be used for re-estimating the phase offset induced by the mixer and recalculating the phase imbalance of the Q branch and the I branch of the optical receiver; and
outputting the amplitude ratio and the phase imbalance of the Q branch and the I branch of the optical receiver when the predetermined condition is satisfied.

10. The method according to claim 9, wherein,
the predetermined condition is that at least one of a number of times of calculating the phase imbalance of the Q branch and the I branch of the optical receiver reaches a first threshold, or a difference between phase imbalance of the Q branch and the I branch of the optical receiver calculated at a current time and phase imbalance of the Q branch and the I branch of the optical receiver calculated at a previous time is less than a second threshold.

11. A non-transitory computer readable storage medium storing a method according to claim 6 for controlling a computer.

* * * * *